United States Patent [19]

Williams

[11] 4,112,523

[45] Sep. 12, 1978

[54] SANITARY DISPOSAL UNIT

[76] Inventor: Geoffrey N. Williams, 12 Rembrandt Dr., Mulgrave, Australia, 3170

[21] Appl. No.: 665,441

[22] Filed: Mar. 9, 1976

[51] Int. Cl.² .............................................. A47K 11/02
[52] U.S. Cl. ...................................... 4/111.3; 4/111.5
[58] Field of Search ................... 4/115, 118, 131, 133; 110/8 E, 9 R, 9 E

[56] References Cited

U.S. PATENT DOCUMENTS

| | | | |
|---|---|---|---|
| 3,110,037 | 11/1963 | Frick et al. | 4/131 |
| 3,139,626 | 7/1964 | Blankenship | 4/131 |
| 3,837,012 | 9/1974 | Rassbach et al. | 4/131 |

*Primary Examiner*—Robert I. Smith

*Attorney, Agent, or Firm*—Cushman, Darby & Cushman

[57] ABSTRACT

A sanitary disposal unit having a waste receptacle located intermediate on apertured seat and a combustion chamber, the waste receptacle being adapted to rotate about a horizontal axis and having at least one waste receiving compartment thereby enabling waste to be received when a compartment is positioned to face upwardly, whereafter the receptacle is rotated to enable the waste to be deposited in the combustion chamber where it is consumed. Automatic linkage means for positioning and rotating the receptacle when a lid is raised and lowered are also provided. Sealing members and heat insulation ensure that heat and odor is inhibited from leaking from the unit.

8 Claims, 6 Drawing Figures

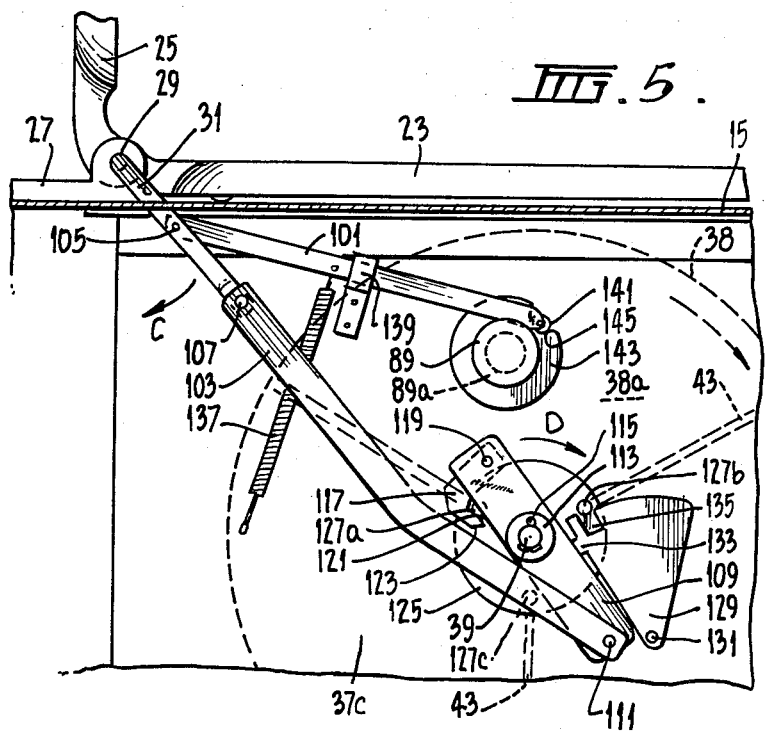
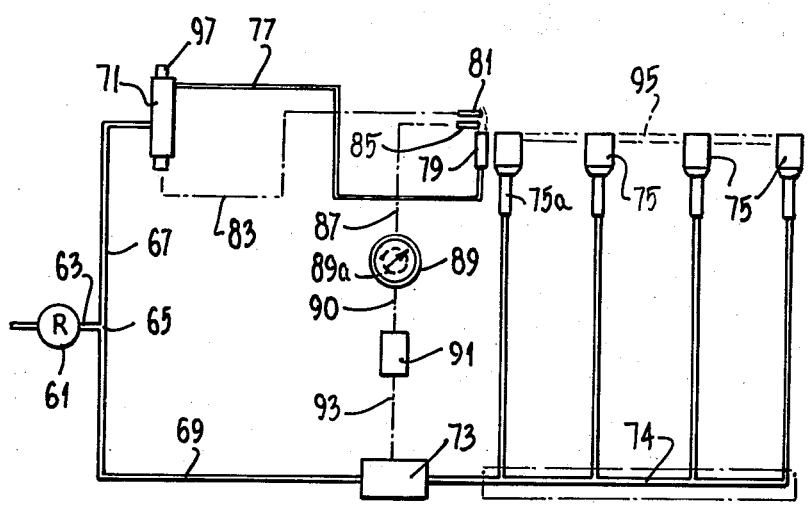

SANITARY DISPOSAL UNIT

BACKGROUND OF THE INVENTION

The present invention relates to sanitary disposal units wherein waste is combusted, and more specifically to such units usable for the destruction of domestic waste, and more particularly units usable, as toilets, for the destruction of excreta.

BRIEF DESCRIPTION OF THE PRIOR ART

In the prior art numerous sanitary disposal units have been proposed. However, few if any of these units have been widely commercially accepted for various reasons. Some of the prior art units have been exceedingly complex and have therefore been prone to failure and have been expensive to manufacture. Other prior art units have been simply constructed but have suffered problems in retaining heat and odour within the unit, away from the user. Having regard to these problems there is therefore a need for a simple, reliable sanitary disposal unit which is thereby cheap to manufacture, but which in use effectively prevents communication of heat and odour from the device, to the user.

SUMMARY OF THE INVENTION

The present invention provides a sanitary disposal unit including:
 a waste receptacle means having at least one waste receiving compartment, said receptacle means being mounted to rotate about a substantially horizontal axis;
 a combustion chamber; and
 heating means located withing said combustion chamber;
whereby said waste receptacle means may be located in a first position in which said compartment may be loaded from above, whereafter said receptacle means is rotatable about said axis to a second position thereby allowing said waste to fall downwardly from said compartment into said combustion chamber wherein said heating means causes combustion of said waste.

A particularly preferred form of the invention provides a sanitary disposal unit including:
 a waste receptacle means having a plurality of circumferentially spaced waste receiving compartments, said receptacle means being mounted to rotate about a substantially horizontal axis;
 a combustion chamber; and
 heating means located within said combustion chamber;
 whereby said waste receptacle may be located in a first position in which one of said compartments may be loaded from above, whereafter said receptacle means is rotated about said axis by
 a linkage means, to a second position, thereby enabling said waste to fall from said one compartment downwardly into said combustion chamber wherein said heating means causes combustion of said waste, and
 causing successive compartments to be placed in a loading position;
 said linkage means comprising:
  a driving disc adapted to rotate about said axis and connected to said waste receptacle means by
  a drive shaft, the plane of said disc being substantially perpendicular to said axis, said disc having extending axially therefrom a plurality of
  pin means, each pin means being circumferentially located upon said disc in a position corresponding to the circumferential position of a different one of said waste receiving compartments,
  arm means rotatable about said axis, and having
   a latching means attached to one end thereof;
 whereby said arm means is rotatable in a first direction about said axis to a position where said latching means engages one of said pin means, whereafter said arm means is rotated in the opposite direction of rotation to said first direction to rotate said driving disc and thereby rotate said waste receptacle means from said first to said second position.

BRIEF DESCRIPTION OF THE DRAWINGS

A preferred embodiment of the present invention will now be described with reference to the accompanying drawings in which:

FIG. 5 is an enlarged sectional view again along lines 4—4 of FIG. 2; and

FIG. 6 is a diagrammatic representation of the gas and electrical circuits utilized in the embodiment of FIGS. 1 to 5.

DESCRIPTION OF THE PREFERRED EMBODIMENT

Figures 1, 2:
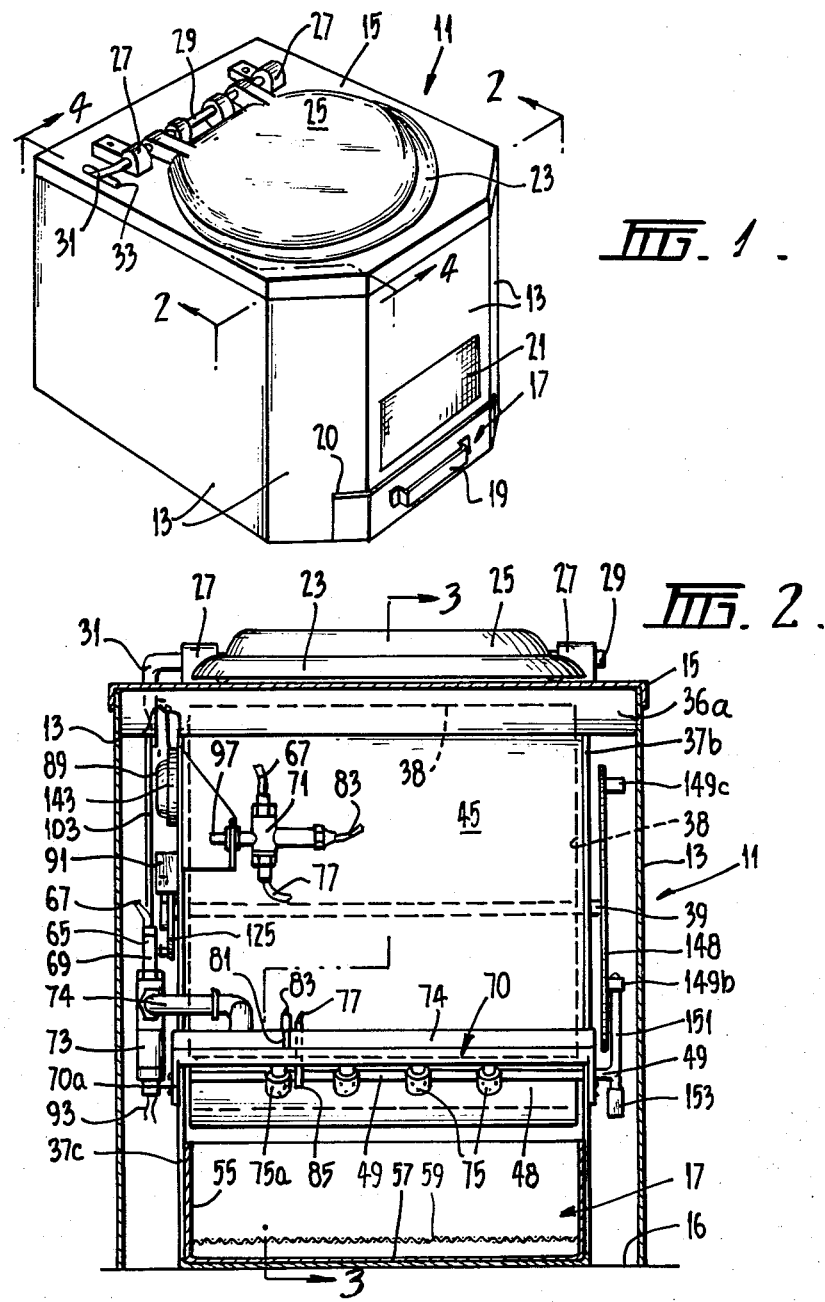
FIG. 1 is a front perspective view from above of a preferred embodiment of the santiary disposal unit.
FIG. 2 is a sectional view along lines 2—2 of FIG. 1.

As seen in FIG. 1, the preferred embodiment includes an outer casing 11 having side panels 13 a top panel 15 and flooring 16. An ashtray 17 having a handle 19 is slideably fitted into an opening 20 in the front of the outer casing of the sanitary disposal unit. An inlet air vent 21 is also provided in the front of the outer casing. An apertured toilet seat 23 and a cooperating lid 25 are attached to the top panel 15 by means of a shaft 29 and hinges 27. Lid 25 is secured to shaft 29 such that raising and lowering lid 25 rotates shaft 29. At one side, shaft 29 extends beyond one of the hinges 27 and is bent to form an elbow 31 which extends through top panel 15 at opening 33 and is connected with mechanism inside the outer casing, which mechanism will be described hereinafter.

Figure 3:
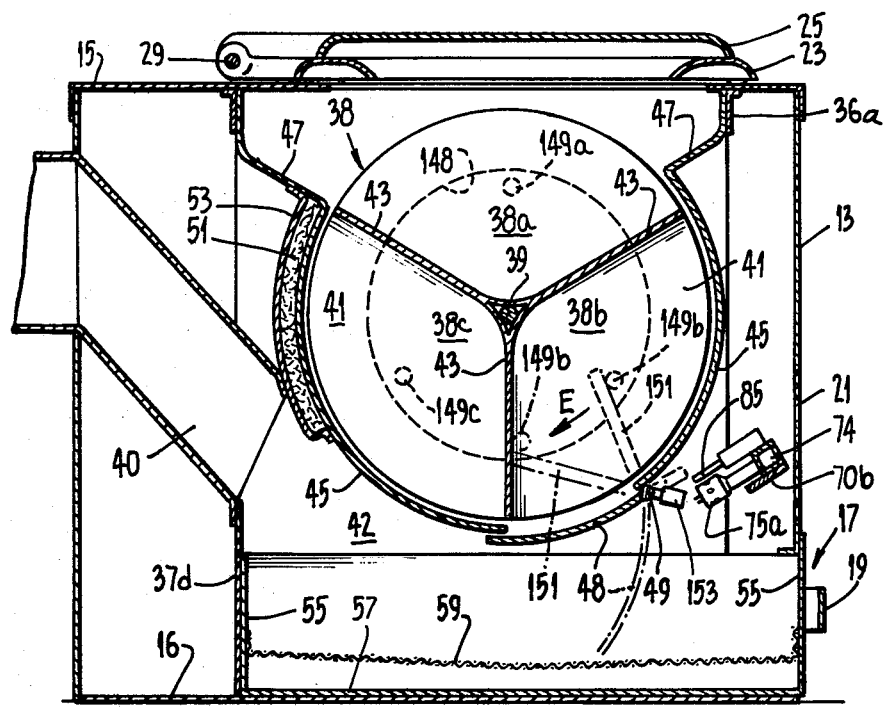
FIG. 3 is a sectional view along lines 3—3 of FIG. 2.

Referring now to FIGS. 2 and 3, cross members 36a, extending in the same direction as shaft 29, extend across the width of the outer casing and are attached to top panel 15 and at each end to side panels 13. Members 36b extend between members 36a and are also attached to top panel 15. An internal casing 35 is constructed within the outer casing and is attached to these cross members 36a and 36b and to the floor 16. The inner casing 35 consists of two side panels 37b and 37c attached to members 36b and sealing members 45 and 48 attached to members 36a. A burner assembly 70 is fitted adjacent front side panel 13. Beneath burner assembly 70 there is an opening through which ashtray 17 is fitted. Burner assembly 70 consists of brackets 70a attached, for example by rivets as shown, to the outside of side panels 37b and 37c, and a cross member 70b between brackets 70a which supports pipes 74, and gas burners 75 as hereinafter described.

A shaft 39 extends between and through side panels 37b and 37c and is rotationally supported thereby.

A waste receptacle 39 consisting of circular end panels 41 (as shown in FIG. 3) and three equally circumferentially spaced radial members 43 extending between panels 41 to thereby define three compartments 38a, 38b and 38c in waste receptacle 38, is secured to shaft 39 and arranged to rotate therewith within inner casing 35. By means of this rotation waste deposited from above, that is through the aperture in toilet seat 23, into the upward facing compartment of compartments 38a, 38b and 38c, is allowed to fall from this compartment downwardly into tray 17. Below waste receptacle 38 between side panels 37b and 37c and extending rearwardly to a rear inner casing side panel 37d there is located a combustion chamber 42 having an exhaust flue 40 sealingly encircled by panel 37d.

Referring now to FIG. 3, side sealing members 45 are shown extending downwardly from side sealing member supports 47 around the circumference of the waste receptacle along the full length thereof, to thus sealingly extend between side panels 37b and 37c. A bottom sealing member 48 is attached to the right of shaft 39, as shown in FIG. 3. This attachment is by means of shaft 49 rotationally attaching member 48 to the right-hand side sealing members 45. Shaft 49 extends between and through side panels 37b and 37c. In the closed position of member 48 (as shown by the full lines in FIG. 3,) members 48, 45 and supports 47 form an effective seal whereby the atmosphere, and heat generated, in combustion chamber 42 are inhibited from communication to receptacle 38 and to the space defined by receptacle 38. Additionally, radial members 43 by their close positioning with respect to sealing members 45, further serve to inhibit the upward communication of odour from compartment 38b. Consequent upon this inhibition, heat and odour from the combustion chamber 42 is substantially prevented from escaping from the sanitary disposal unit. Additionally, a small quantity of heat insulating material 51 is located along the length of receptacle 38, on the flue side thereof, and in a circumferential region extending downwardly from the support 47 to below the upper surface of flue 40 at its connection with combustion chamber 42. Insulating material 51 is located in place by retaining wall 53. As will be hereinafter described, member 48 may swing downwardly to the dotted position shown in FIG. 3 to thereby create a longitudinal opening, and enable waste to pass from the compartments of receptacle 38 through this opening onto tray 17 in combustion chamber 42.

Combustion chamber 42 extends rearwardly from burner assembly 70 to a rear inner casing side panel 37d located between inner side panels 37b and 37 c and between sealing members 48 and 45 and flooring 16. Rear panel 37d encircles flue 40 and is sealingly engaged therewith e.g. by welding. When burner assembly 70 is in operation, air flows into the combustion chamber through air inlet vent 21 and some of this air is mixed with supply gas by the burners 75. The flame from burner assembly 70 is trained under receptacle 38 in the region in which waste is deposited onto tray 17. Thus gas flow is downwardly and rearwardly from the burner assembly 70 to the region of tray 17 which is to the right of the centre of receptacle 38 as seen in FIG. 3, after which the gas flow is upwardly and rearward into flue 40.

Referring now to FIGS. 2 and 3, tray 17 is seen to extend from front side panel 13, under burner assembly 36 to cover the entire bottom area of combustion chamber 42 and to enable waste falling from receptacle 38 to be deposited in tray 17. Tray 17 consists of side walls 55, bottom member 57 and screen 59.

Referring to FIG. 6, the gas and electrical circuits utilized in the unit of FIG. 1 to 5 will now be described. Gas pipes are indicated by double lines whilst electrical wiring is indicated by single dotted lines. Gas is supplied to regulator 61 from which pipe 63 leads to branch member 65. From branch 65, pipes 67 and 69 supply gas to flame failure valve 71 and solenoid valve 73 respectively. From the solenoid valve 73, pipes 74 supply gas to each of four burners 75. From flame failure valve 71, pipe 77 supplies gas to pilot burner 79 located adjacent one of the burners 75a. Pilot burner 79 serves to ignite burner 75a. From burner 75a flame transfer tube 95 conveys this ignition to the other burners 75. A thermocouple 81 located in the flame from pilot burner 79, is electrically connected by wire 83 to flame failure valve 71. Flame failure valve 71 includes control button 97. A thermocouple 85 is also located in the flame from pilot burner 79 and is electrically connected by wire 87 to the electrical switch 89a of a timer 89. Switch 89a is electrically connected by wire 90 to a further electrical switch 91 which in turn is electrically connected by wire 93 to solenoid valve 73.

Suitable apparatus for incorporation in the above described gas and electrical circuits are as follows:

Flame failure valve 71 — S.I.T. (Societe Italiana Technica) Model M1
Solenoid Valve 73 — HONEYWELL V.S. 8187
Thermocouples 81 and 85 — HONEYWELL Q313
Burners 75 — AEROMATIC SEAGAS 1" Model
Pilot Burner 79 — HONEYWELL Q314
Timer 89 — SANKYO TS60S3
Switch 91 — BURGESS V3 Series The location of the apparatus described with reference to FIG. 6, will now be described with reference to FIGS. 2 and 4.

Figure 4:
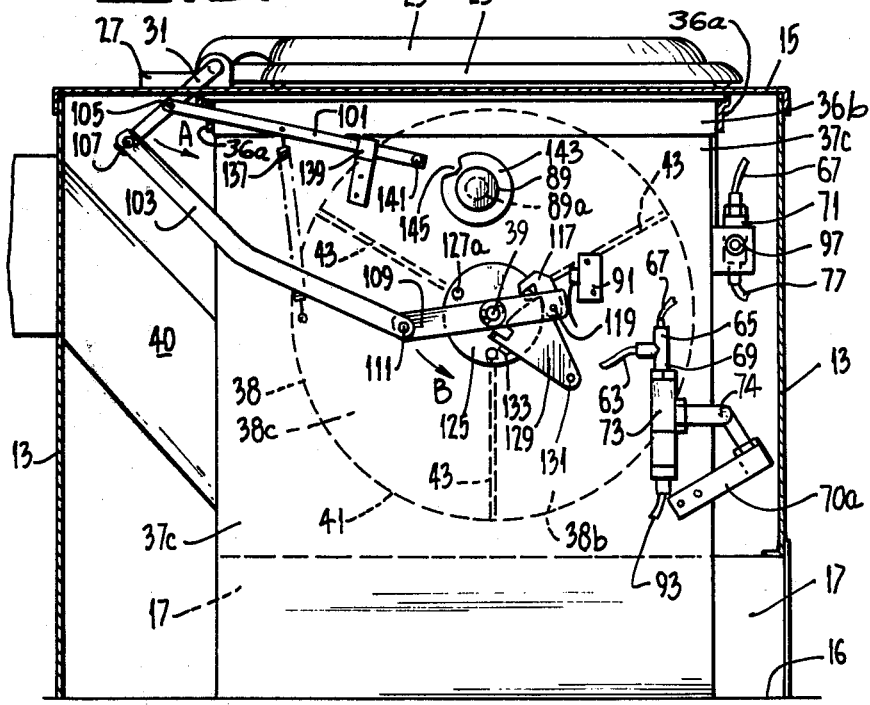
FIG. 4 is a sectional view along lines 4—4 of FIG. 1.

As seen in FIG. 4, supply gas pipe 63 is connected to branch member 65. Branch 65 is connected by pipe 69 to solenoid valve 73 which is the lower of the two valves shown in FIGS. 2 and 4. As seen in FIG. 2, pipe 74 supplies gas from solenoid valve 73 to burner assembly 70 consisting of four burners 75. Thermocouple 85 is located in a position such that the flame from pilot 79 impinges thereon. Thermocouple 85 is electrically connected by wire 87 to timer switch 89a of timer 89, which timer is located on the outside of panel 37c. Switch 89a is electrically connected by wire 90 to switch 91 which also is located on the outside of panel 37c. Switch 91 is electrically connected to solenoid valve 73 by wire 93. Gas pipe 67 connects branch 65 to flame failure valve 71 which is the upper of the two valves shown in FIGS. 2 and 4. From flame failure valve 71 pipe 74 is connected to pilot burner 79 positioned such that the pilot burner flame ignited burner 75a which is the burner having the farthest location to the left in FIG. 2. Flame transfer tube 95 (not shown in FIG. 2 or 4) spreads the flame from burner 75a to the other three burners 75. Wire 83 electrically connects flame failure valve 71 to thermocouple 81 which is positioned such that the flame from pilot burner 79 impinges thereon. Flame failure valve 71 includes control button 97.

In an attempt to leave FIGS. 2 and 4 uncluttered, the interconnection of pipes 63, 67 and 77 and the connection and location of wiring 83, 87, 90 and 93 has not been shown in these Figures.

The mechanism by which receptacle 38 is rotated into a position to deposit waste into tray 17, and the function of the gas and electrical circuits whereby the waste deposited in tray 17 is consumed, will now be described.

As hereinbefore described shaft 29 is bent to form an elbow 31 which extends through opening 33 in top panel 15. Referring to FIG. 4, which shows the outside of side panel 37c, two arms 101 and 103 are pivotally attached to elbow 31 by means of pivot pins 105 and 107 respectively. Arm 103 has a slight bend therein for a purpose which will be appreciated later when reference is made to FIG. 5. Arm 103 is pivotally attached to one end of arm 109 by pivot pin 111. Arm 109 is rotationally attached to shaft 39 and is axially secured thereto by washer 113 and split pin 115. At the other end of arm 109 a latch means 117 is pivotally attached by means of pivot pin 119.

Referring to FIG. 5, latch means 117 is seen to have a hook-shaped configuration with a latching surface 121 and a camming surface 123.

Located between latching means 117 and side panel 37c a circular driving disc 125 is attached to shaft 39. Driving disc 125 may be welded to shaft 39, or more desirably is fitted around shaft 39 by a sleeve and secured in position by a grub screw (not shown). By use of a grub screw the relative circumferential position of driving disc 125 and the compartments 38a, 38b and 38c of waste receptacle 38 may be altered.

Driving disc 125 has three circumferentially equally spaced driving pins 127a, 127b and 127c protruding outwardly therefrom. The circumferential spacing of pins 127 corresponds to the spacing of compartments 38a, 38b and 38c, to thereby enable each of these compartments to first be placed in an upward facing position similar to compartment 38a in FIGS. 3, 4 and 5 and then by rotation of receptacle 38 in the clockwise direction as seen in these Figures, to be placed in a position similar to compartment 38b thereby enabling the waste in the compartment to fall downwardly from receptacle 38 to tray 17.

A stop means 129 is pivotally located on the outside of panel 37c by pivot pin 131. Stop means 129 is a flat member in the form of segment of a circle. Stop means 129 is located between arm 109 and driving disc 125 and is located on panel 37c by pin 131 at a position, such that the contacting force of pin 127b against stop means 129 caused by rotation of disc 125 in the clockwise direction, abuts stop means in a direction passing through pin 131. There is therefore no tendency for stop means 129 to be rotated about its pin 131 and out of the path of pin 127b thus stop means 129 is stable in the position shown in FIG. 4 and thereby prevents clockwise rotation of disc 125 and thus receptacle 38, past the position shown in FIG. 4.

The means by which latching means 117 rotates disc 125 and thus receptacle 38 will now be described.

In order to use the sanitary unit lid 25 must first be raised. Lifting lid 25 thereby rotates elbow 31 in the direction of arrow A in FIG. 4. This movement, by means of arm 103 rotates arm 109 in the direction of arrow B in FIG. 4.

Attention is now directed to FIG. 5. Rotation of arm 109 brings latching means 117 into abutting relationship with pin 127a whereby camming surface 123 rotates latching means 117 upwardly against gravity, up over pin 127a. Once camming surface 123 has cleared pin 127a means 117 falls downwardly into the latching position shown in FIG. 5 whereby pin 127a is engaged by latching surface 121.

As hereinbefore referred, arm 103 has a slight bend therein and by now referring to FIG. 5 it is seen that this bend ensures that arm 103 does not abut shaft 39, washer 113 or split pin 115.

At the same time as the above described latching movement of means 117, protrusion 133 which extends outwardly from stop means 129, as seen in FIG. 5, abuts arm 109 and thereby, stop means 129 is rotated clockwise about pin 113 to a position where pin 127b can pass into recess 135 of stop means 129. At this point, the rotation of disc 125 and hence receptacle 38 is no longer prevented solely by stop means 129. In fact means 129 is no longer itself capable of preventing rotation since the line of action of foce from pin 127b does not pass through pin 131. However protrusion 133 abutting arm 109 prevents downward rotation of means 129 and disc 125 is prevented from clockwise rotation by pin 127b resting in recess 135.

After deposition of waste into compartment 38a, lid 25 is lowered thereby moving elbow 31 in the direction of arrow C in FIG. 5, whereby arm 103 causes rotation of arm 109 in the direction of arrow D in FIG. 5. Consequently latching means 117, by means of driving pin 127a, rotates disc 125 and receptacle 38 in the clockwise direction, while stop means 129 is rotated, by pin 127b in recess 135, in the anti-clockwise direction with reference to FIG. 5. As lid 25 is brought into its downward resting position, the entire apparatus again takes up the positions seen in FIG. 4, except that receptacle 38 has been rotationally displaced clockwise in accordance with the circumference of one compartment. Durin this rotation the waste in compartment 38a has fallen into tray 17 and pin 127b has cleared recess 135 of stop means 129.

At the opposite end of shaft 39, on the outside of side panel 37b a second disc 148 is attached to shaft 39 by similar means to that of disc 125. Disc 147 has three pins 149a, 149b and 149c protruding outwardly therefrom, as seen in FIGS. 2 and 3. Shaft 49 protrudes through side wall 37b and has attached thereto an elbow 151. Disc 147 is circumferentially positioned such that, as receptacle 38 rotates, as seen in FIG. 3 in dotted lines, pin 147b engages elbow 151 to thereby rotate shaft 49 and lower sealing member 48 to create an opening in the sealing members, through which the waste falls into tray 17. As receptacle 38 is rotated, elbow 151 clears pin 149b and counterweight 153 returns member 48 to the closed position. The length of elbow 151 is fabricated such that member 48 is opened for sufficient rotational movement of receptacle 38 to allow the waste to fall through.

Raising and lowering of lid 25 also causes movement of arm 101. Arm 101 is donwardly biased by spring 137 againt guide means 139. Guide means 139 serves to control the vertical positioning of engaging pin 141, during its movement which is brought about by its location at the end of arm 101. The downward extent of this movement is controlled by means of a vertically acting adjustable contact screw located in guide means 139 (not shown). Timer 89 has attached to its rotary timing mechanism a circumferential ring 143 having a recess 145. Timer 89 is of the type whereby, if ring 143 is rotated from the "off" position as seen in FIG. 5, in the anticlockwise direction then the time taken for the timer to return to its "off" position is directly proportional to the anticlockwise arc through which ring 143 is turned. In the "off" position at the end of the time period, switch 89 opens circuit.

Referring to FIG. 5 which shows timer 89 in its "off" position after its timing period it will be appreciated that as lid 25 is raised, pin 141 rides up over the circumference of ring 143 until pin 141 drops into recess 145. If timer 89 is not already in the off position, once pin 141 has engaged recess 143, the continued raising of the lid to the upward resting position as seen in FIG. 5 serves to reset the timer to "off". Lowering lid 25 moves pin 141 away from timer 89 and thereby rotates the timer to its "on" position. The amount of arc through which the timer is turned and thus the timing period, is adjustable by the above referred adjustable contact screw (not shown).

Referring to FIG. 4, a switch 91 is located on the outside of panel 37c in a position such that switch 91 is biased into the "on" position, by arm 109, only when arm 109 is in the position shown in FIG. 3, with the lid 25 down.

The operation of the gas and electrical circuits will now be described. Raising lid 25, resets timer 89 and switch 89a to "off" and engages pin 141 into recess 145. Waste may then be deposited into upwardly facing compartment 38a. Closing lid 25 rotates receptacle 38 such that the next compartment faces upwardly, rotates member 48 to the open position and thereby allows waste to fall into tray 17. Closing lid 25 also turns timer 89 to its "on" position, initiating the time period and turning switch 89a "on". Arm 109 also turns switch 91 "on". Thus referring now to FIG. 6, so long as the pilot burner is alight, voltage is conducted from theremocouple 85, through switches 89a and 91 to solenoid 73 which thereby connects the combustible gas supply to burners 75, and combustion of the waste commences. Burners 75 are turned "off" when the time period ends and switch 89a cuts off this voltage thereby closing solenoid 73. The cycle may be interrupted at any time by raising the lid thereby opening switch 91 and resetting timer 89. The sanitary disposal unit may therefore be used even through its cycle is incomplete, and burners 75 are extinguished by switch 91 immediately lid 25 is raised.

The operation required to start pilot burner 79 and thereby place said sanitary unit into operational condition, will now be described. Depressing and holding button 97 initiates gas supply to pilot burner 79. The flame from pilot burner 79 impinges on thermocouple 81, and once it is heated to operational temperature by this flame, thermocouple 81 generates a voltage which is conducted to flame failure valve 71 by wire 83 and thereby ensures the continuance of gas supply to pilot burner 81. Button 97 may then be released.

If the gas supply should fail or by some other means, pilot burner 79 is accidentally extinguished, gas flow through both solenoid valve 73 and flame failure valve 71 is prevented since neither of thermocouples 81 or 85 is impinged upon by the flame from burner 79 to thereby generate the voltages required to open valves 71 and 73. Thus gas leakage is prevented.

Preferably inner casing 35, receptacle 38, sealing members 45, 47 and 48, flue 40, tray 17, flooring 16 and all mechanical linkages, are fabricated in stainless steel to thereby promote both sanitation and corrosion resistance. Outer casing 11 is preferably fabricated to be covered in stove enamel.

Compartments 38a, 38b and 38c of receptacle 38 may be cleaned when necessary, e.g. for sanitation, by use of cleaning brushes together with detergents and antiseptics. Alternatively combustibel wax paper inserts may be placed into each compartment before use to thereby ensure that the compartments are maintained in a sanitary condition. Ashtray 17 should be regularly emptied to ensure that it does not become over filled with ash.

Preferably a twelve minute combustion cycle should be used when the four one inch SEAGAS gas burners, as hereinbefore specified, are used to thereby generate 34,000 Btu/hr. of heat.

Preferably said flue includes a down draft diverter (not shown) to thereby prevent combustion products from flowing down the flue and causing backflow of heat and odour through inlet air vent 21.

The above described preferred embodiment results in a number of advantages; it is a simple mechanical arrangement and mechanism which is thereby relatively cheap to manufacture and is reliable in operation. Additionally, the utilization of an intermediate receptacle isolated from the combustion chamber by the sealing members enables the user to be effectively isolated from heat and odour.

Additionally, the above described structure of the disposal unit enables the use of an ashtray whereby consumed waste may be readily disposed of. Further the above described structure does not require connection of any electrical power but is powered simply by combustible gas.

Since modifications to the preferred embodiment within the spirit and scope of the present invention may be readily effected by persons skilled in the art, it is to be understood that this application is not limited to the particular embodiment described by way of example hereinabove.

The claims defining the invention are as follows:

1. A sanitary disposal unit including: a rotatable waste receptacle means having at least one waste receiving compartment; a combustion chamber disposed below said receptacle means; heating means located within said combustion chamber; and upwardly facing arcuate sealing means located closely adjacent said receptacle means and between said combustion chamber and said receptacle means, said sealing means including an opening having a door; said rotatable waste receptacle means being locatable in a first position in which said waste-receiving compartment may be loaded from above, whereafter said receptacle means is rotatable to a second position thereby allowing said waste to fall downwardly from said compartment through said opening and into said combustion chamber wherein said heating means causes combustion of said wastes; said sealing means inhibiting communication of heat and odour from said combustion chamber to said receptacle means; said door opening means being responsive to the rotation of said receptacle means from said first to said second positions to open said door to thereby enable said waste to fall through said opening.

2. A sanitary disposal unit as claimed in claim 1, wherein said waste receptacle means defines a plurality of circumferentially spaced waste receiving compartments arranged such that each rotation of said waste receptacle means from said first position to said second position results in successive compartments being placed in a loading position.

3. A sanitary disposal unit as claimed in claim 2, wherein said sealing means extends at least around the portion of said waste receiving compartment which is adjacent to said combustion chamber.

4. A sanitary disposal unit as claimed in claim 3, wherein said door opening means comprises a lever means and a counterweight each connected to said door by a drive shaft, and a plurality of lugs connected to said receptacle means, each lug being circumferentially spaced in a position corresponding to the circumferential spacing of a different one of said waste receiving compartment; whereby rotation of said waste receptacle from said first to said second position engages one of said lugs against said lever means thereby opening said door, whereafter said lever means and said one leg become disengaged and said counterweight acts to close said door.

5. A sanitary disposal unita as claimed in claim 2, wherein said waste receptacle means is substantially equally circumferentially divided into three compartments.

6. A sanitary disposal unit including: a waste receptacle means having a plurality of circumferentially spaced waste receiving compartments, said receptacle means being mounted to rotate about an axis; a combustion chamber; heating means located within said combustion chamber; sealing means located between said combustion chamber and said receptacle means, said sealing means including an opening having a door and a door opening means; said waste receptacle being locatable in a first position in which one of said compartments may be loaded from above, whereafter said receptacle means may be rotated about said axis by a linkage means, to a second position thereby enabling said waste to fall from said one compartment downwardly through said opening and into said combustion chamber wherein said heating means causes combustion of said waste, and causing successive compartments to be placed in a loading position; said sealing means inhibiting communication of heat and odour from said combustion chamber to said receptacle means; said door opening means opening said door during the rotation of said receptacle means from said first to said second positions to thereby enable said waste to fall through said opening; said door opening means comprising a lever means and a counterweight each connected to said door by a drive shaft, and a plurality of lugs connected to said receptacle means, each lug being circumferentially spaced in a position corresponding to the circumferential position of a different one of said waste receiving compartments; whereby rotation of said waste receptacle from said first to said second position engages one of said lugs against said lever means thereby opening said door whereafter said lever means and said one lug become disengaged and said counterweight acts to close said door; said linkage means comprising a plurality of spaced pin means connected to said receptacle means, each pin means being circumferentially spaced in a position corresponding to the circumferential spacing of a different one of said waste receiving compartments, and arm means rotatable about said axis, said arm means having a latching means attached to one end thereof; whereby said arm means is rotatable in a first direction about said axis to a position where said latching means engages one of said pin means, whereafter said arm means is rotatable in the opposite direction of rotation to said first direction to thereby rotate said waste receptacle means from said first to said second positions.

7. A sanitary disposal unit as claimed in claim 6, wherein said sealing means extends at least around the portion of said waste receiving compartment which is adjacent to said combustion chamber.

8. A sanitary disposal unit as claimed in claim 7, wherein an ashtray is fittable into the bottom of said combustion chamber, whereby said waste falls into said ashtray and ashes are formed in said tray by the combustion of said waste whereafter said tray may be removed from said combustion chamber.

* * * * *